United States Patent [19]

Obeda

[11] E Patent Number: Re. 33,063

[45] Reissued Date of Patent: Sep. 19, 1989

[54] APPARATUS AND METHOD FOR ULTRASONICALLY JOINING SHEETS OF THERMOPLASTIC MATERIALS

[76] Inventor: Edward G. Obeda, Sunset Hill Rd., Brookfield Center, Conn. 06805

[21] Appl. No.: 245,202

[22] Filed: Sep. 16, 1988

Related U.S. Patent Documents

Reissue of:

[64] Patent No.: 4,713,131
Issued: Dec. 15, 1987
Appl. No.: 870,920
Filed: Jun. 5, 1986

[51] Int. Cl.[4] ..... B29C 65/06; B29C 65/08

[52] U.S. Cl. ..... 156/73.1; 156/73.4; 156/73.5; 156/309.6; 156/544; 156/555; 156/580; 156/580.1; 156/580.2; 264/23; 425/174.2

[58] Field of Search ..... 156/73.1, 73.4, 73.5, 156/309.6, 544, 546, 555, 580, 580.1, 580.2, 582; 264/23; 425/174.2

[56] References Cited

U.S. PATENT DOCUMENTS

| | | | |
|---|---|---|---|
| 3,376,179 | 4/1968 | Balamuth | 156/73.1 |
| 3,443,277 | 5/1969 | Frielingsdorf | 156/73.1 |
| 3,654,043 | 4/1972 | Jacobi | 156/544 |
| 3,804,697 | 4/1974 | Jacobi | 156/582 |
| 4,101,370 | 7/1978 | Russell | 156/582 |

*Primary Examiner*—Michael Wityshyn
*Attorney, Agent, or Firm*—Haynes N. Johnson

[57] ABSTRACT

Apparatus for welding sheets (3a, 3b) of themoplastic material together along proximate edges including a supporting frame (25), a pair of joining rollers (11,13) mounted on the frame and forming a nip (12) with an axis parallel to the axes of the rollers, a motor (23) to drive at least one of the rollers, a horn (15) having a tip (17), and an ultrasonic transducer (39) to reciprocate the horn (15) and tip (17) in the direction of the longitudinal axis of the horn (15), the horn being so positioned in the nip (12) that the tip reciprocates in a direction transverse to the axis of the nip (12), so that proximate edges of the sheets (3a,3b) may move through the nip (12) with one edge on each side of the tip (17), be uniformly melted on their surfaces by frictional energy created by the reciprocal motion of the tip (17), and then be pressed and welded together in the nip (12). Fault detection circuitry stops the operation if the sheet material is not properly overlapping or if it runs out.

31 Claims, 14 Drawing Sheets

Fig. 3
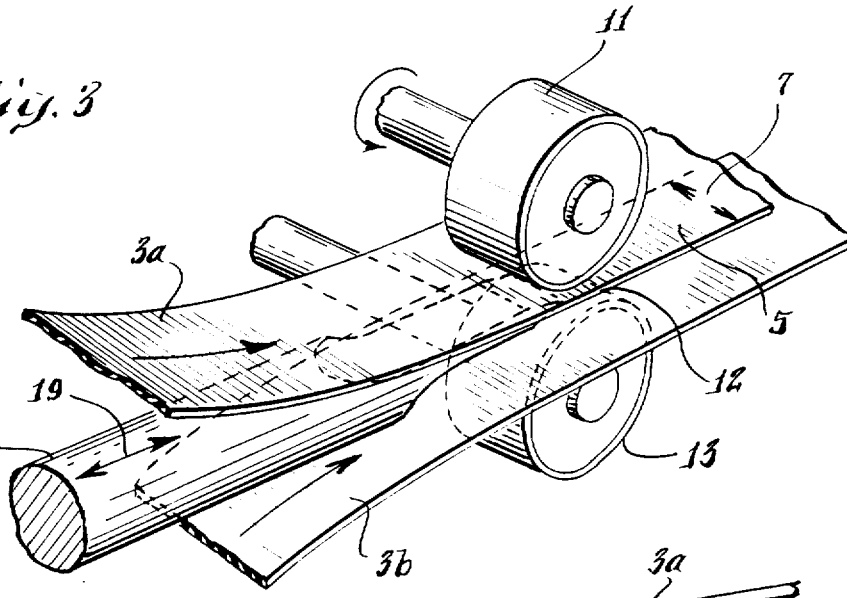
Fig. 5.
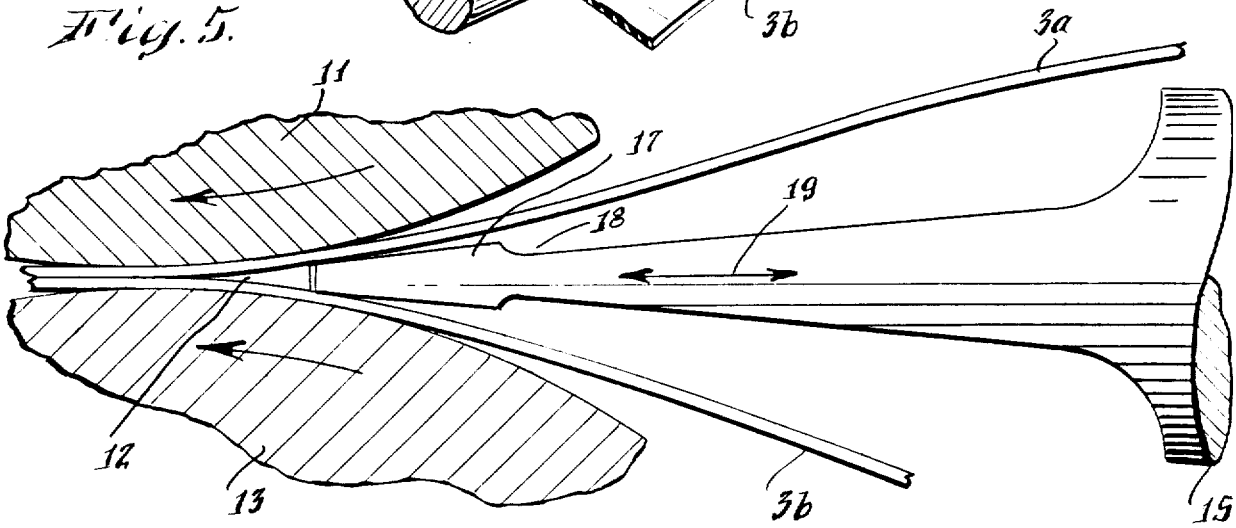
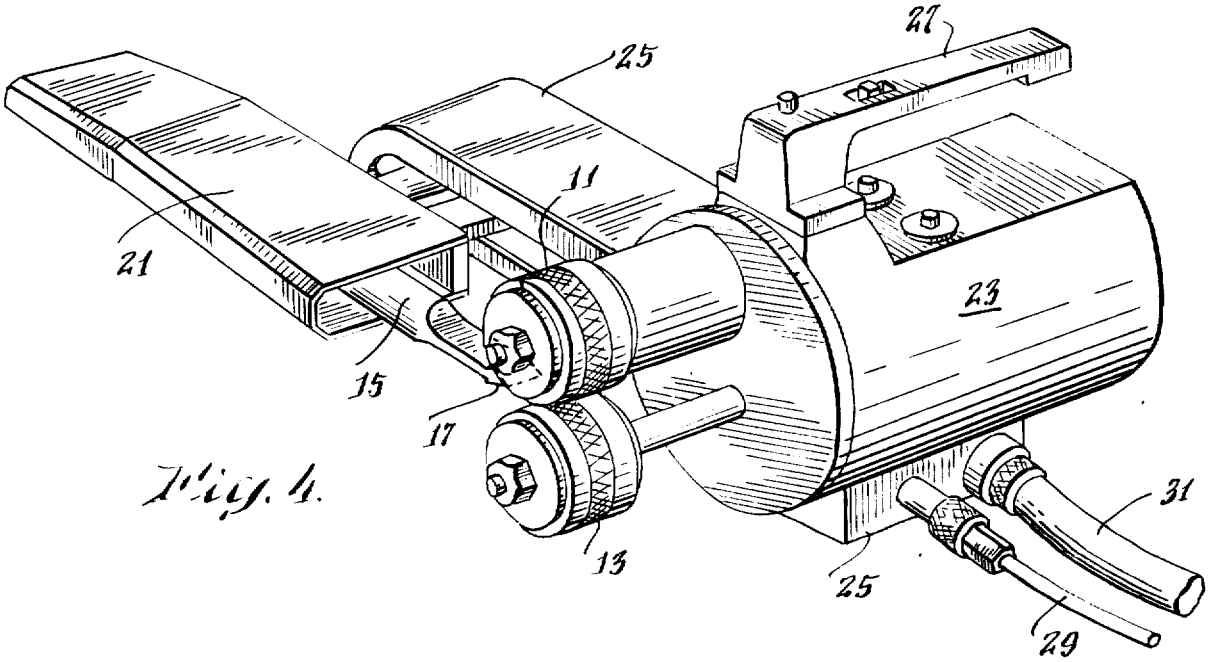
Fig. 4.

39
41
15
36
3a
55
57
100%
75%
50%
25%
0
SEAL STRENGTH
49
51
46
17
44
45
43
5a
7a
DESIRED SEAM WIDTH
AMPLITUDE AT TOP OF SEAL
AMPLITUDE AT BOTTOM OF SEAL
PRIOR ART 45
43
45
45
47
49
TRANSDUCER
BOOSTER
HORN
NODE
NODE
NODE
39
41
15
37

Fig. 12.
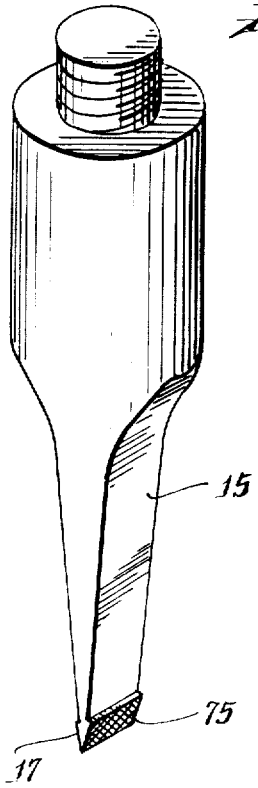
Fig. 13.
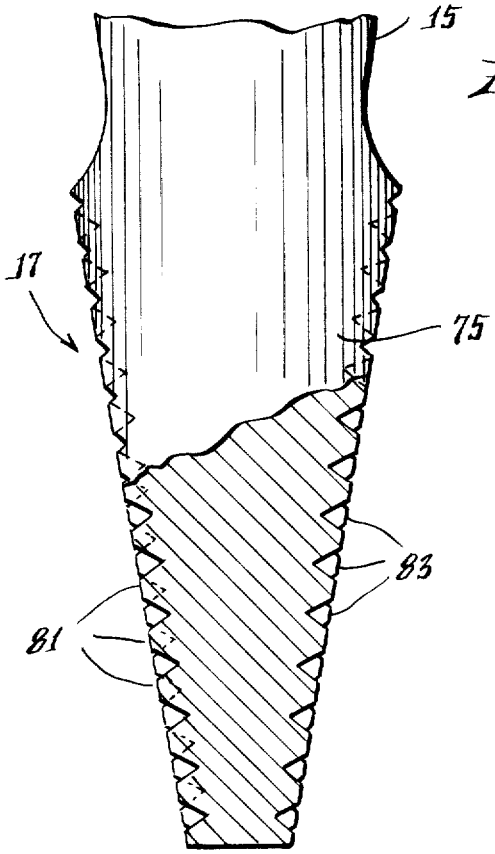
Fig. 14.
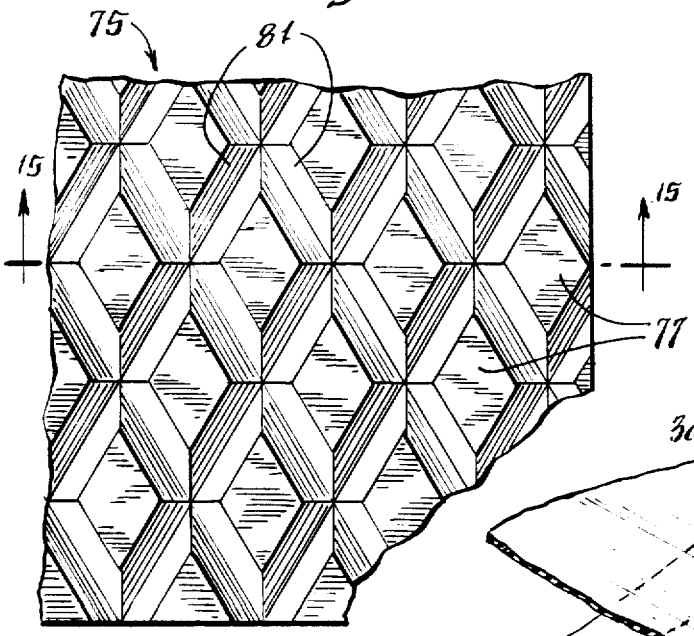
Fig. 15.
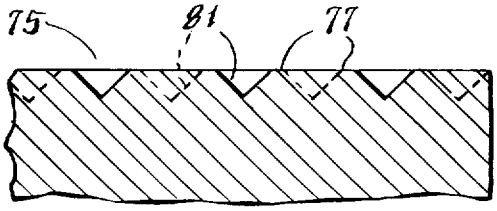
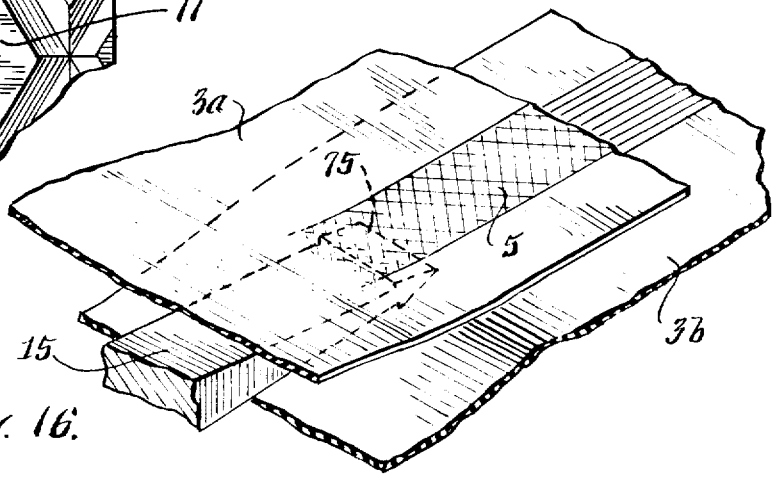
Fig. 16.

LOADING POSITION

Fig. 24.
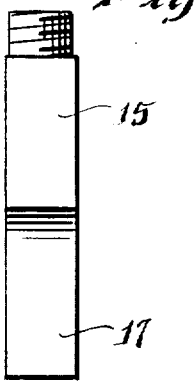
Fig. 25.
Fig. 26.
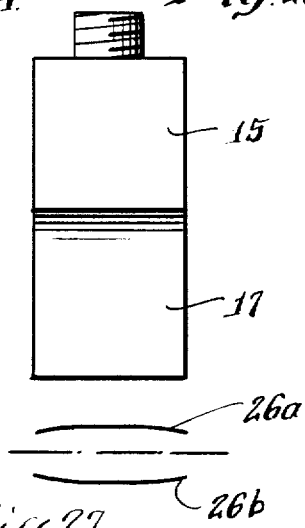
Fig. 27.
Fig. 28.
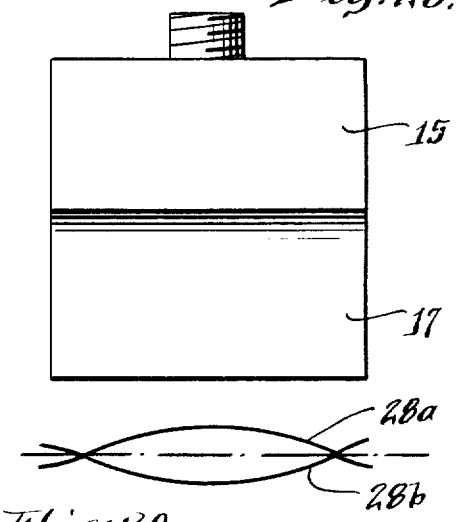
Fig. 29.
Fig. 30.
PRIOR ART
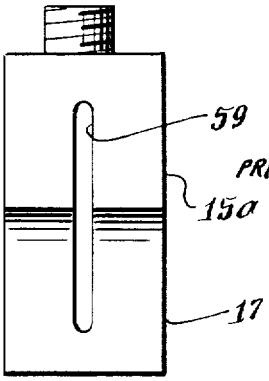
Fig. 31.
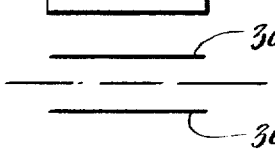
Fig. 32.
PRIOR ART
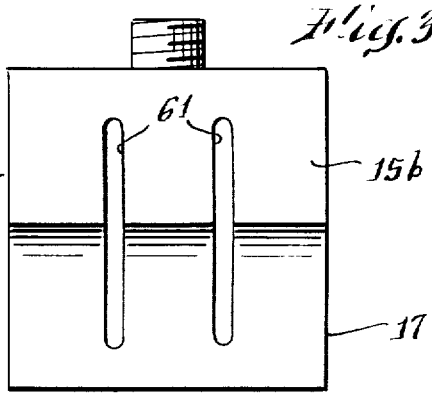
Fig. 33.
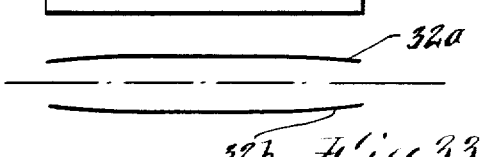
Fig. 34.
PRIOR ART
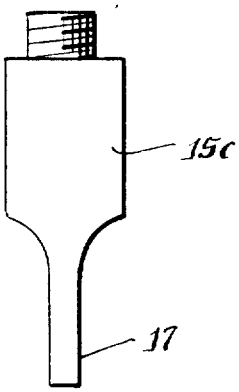
Fig. 35.
PRIOR ART
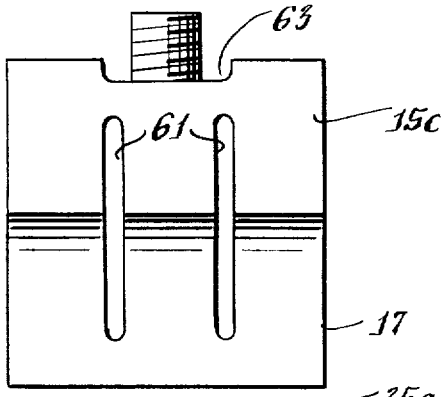
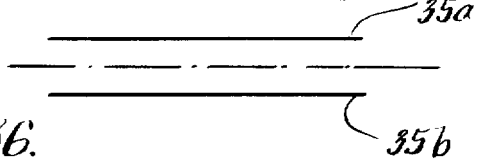
Fig. 36.

Fig. 37.
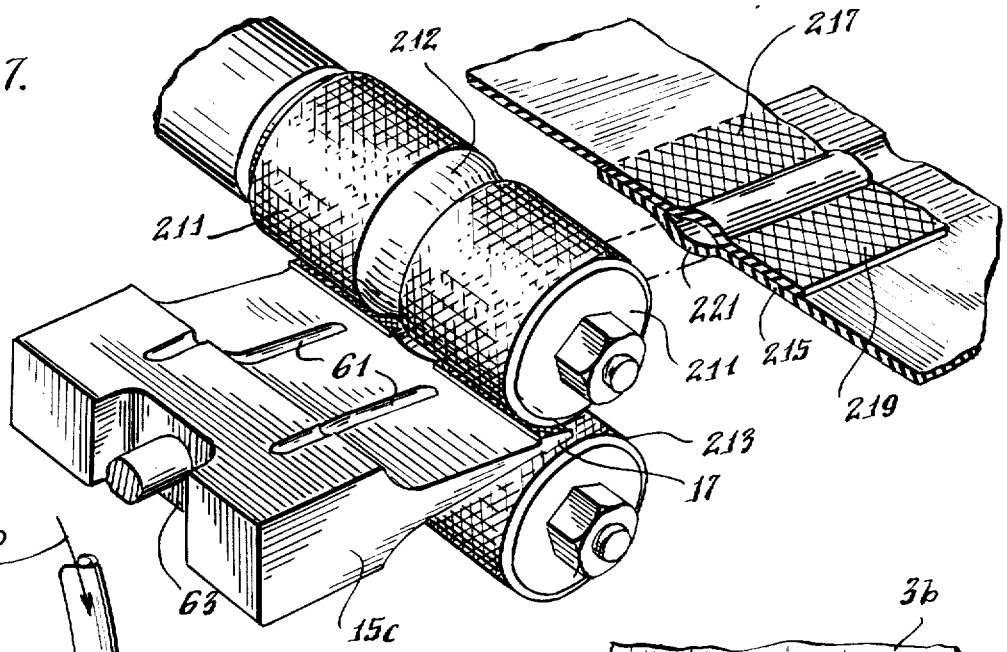
Fig. 38.
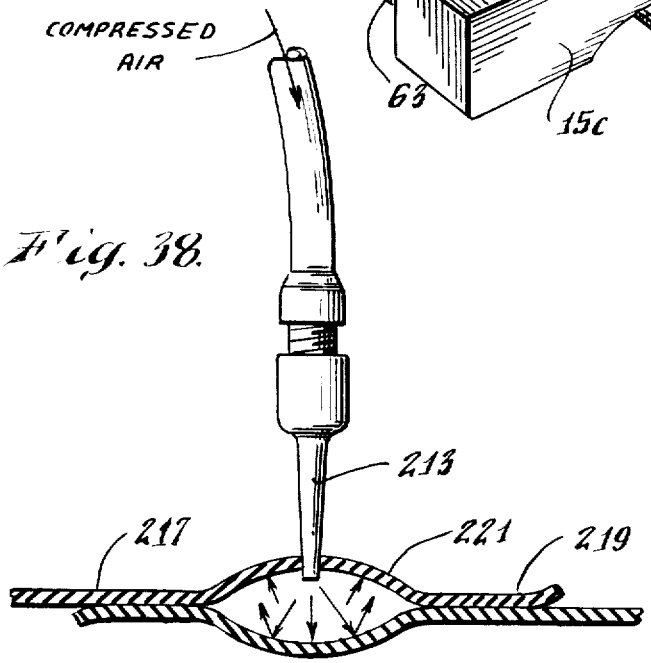
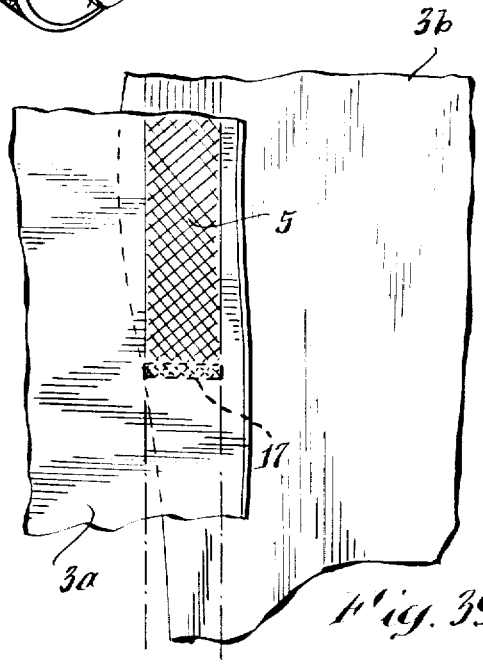
Fig. 39.
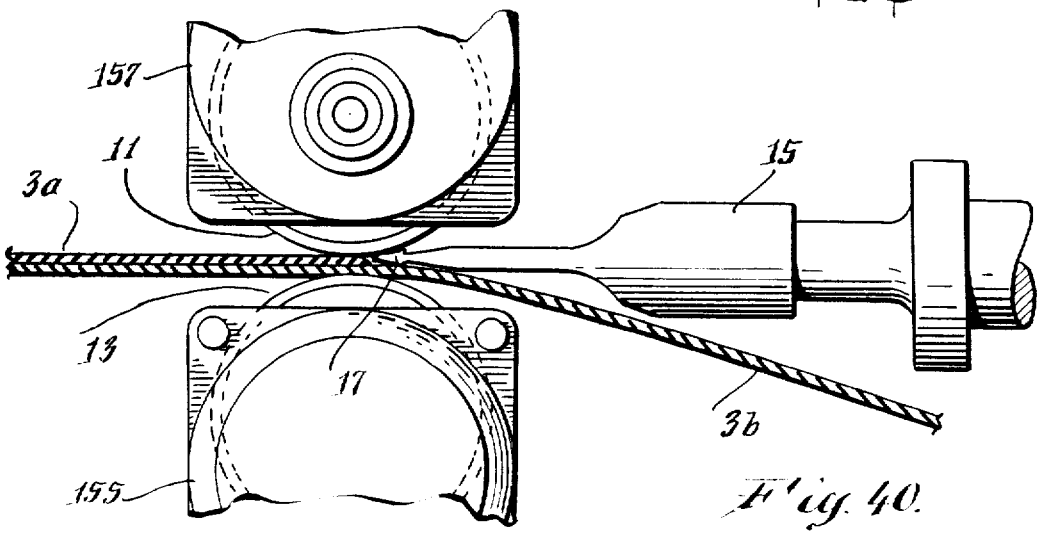
Fig. 40.

APPARATUS AND METHOD FOR ULTRASONICALLY JOINING SHEETS OF THERMOPLASTIC MATERIALS

Matter enclosed in heavy brackets [ ] appears in the original patent but forms no part of this reissue specification; matter printed in italics indicates the additions made by reissue.

FIELD OF THE INVENTION

This invention relates to the welding together of sheets of thermoplastic material. The welding is accomplished by fusing overlapping areas, along the edges of adjacent sheets, using heat generated by friction resulting from high frequency reciprocating vibration of a horn positioned at the point of weld.

BACKGROUND OF THE INVENTION

One prior art method of joining sheets has been to apply a layer of heat-fusible adhesive either between the layers or along the edge of the overlap.

Another method of welding thermoplastic materials is to use frictional heat generated at the point of weld by high frequency mechanical motion. This has been done by rubbing a tool moving at high frequency and small amplitude against the thermoplastic material at the point of weld, to generate frictional heat, such as is shown in Balamuth U.S. Pat. No. 3,321,558.

Another technique is shown in Balamuth U.S. Pat. No. 3,376,179. There, a single vibrating tool rubbing against the workpiece itself was used to generate heat. The tool was placed in the nip where two sheets of material came together and vibrated at high frequency, the objective being to generate sufficient heat to join the sheets by fusion. His tool, however, reciprocated in a direction parallel to the nip between the materials and, for reasons set forth below in connection with the discussion of FIGS. 7 and 8, would not produce a satisfactory uniform seal. As a result, it has not been commercially successful.

By contrast, the present invention uses an ultrasonic transducer to vibrate a welding horn and positions the horn so that the horn vibrates against the two sheets being welded in a direction perpendicular to the nip. This relationship produces a uniform seal because the uniformity of the motion of the tip of the horn serves to create the same amount of frictional heat at all points in the nip. For wide horns, the uniformity of motion can be further enhanced by using structures such as those shown in Holze U.S. Pat. No. 4,363,992.

SUMMARY OF THE DISCLOSURE

Thermoplastic sheet material is joined along overlapping edges by heating the area between the sheets at the overlap so as to fuse the sheets together. The heat is caused by friction resulting from high frequency reciprocating motion of the tip of a horn positioned within a nip between the two sheets, which nip runs transversely to the longitudinal direction of the seam being formed. The reciprocating motion is in a direction longitudinal of the seam being formed and perpendicular to the nip. It is at an ultrasonic frequency, preferably between 20 and 50 kilohertz.

By using a serrated or knurled horn tip, possible contaminants are disrupted on the surfaces of the sheets and the fused material from both of the sheets is intermixed at the point of weld, creating an intermixed zone in the final product with a uniform and strong bond.

The method permits making wide seams, considerably wider, and stronger, than the approximately one-fourth inch width maximum available under prior art systems using ultrasonic methods.

The apparatus used includes means for feeding the sheet materials at uniform speeds, means for supporting the horn and its serrated tip, and for generating high frequency ricprocating motion, and means for detecting problems such as uneven overlap and lack of sheet material.

DESCRIPTION OF THE DRAWINGS

Turning to the drawings

FIG. 3 is a perspective view of a portion of a simplified version of the apparatus of my invention.

FIG. 4 is a perspective view of my apparatus.

FIG. 5 is a side elevation (schematic) of sheets of thermoplastic material passing through the nip of joining rollers and being melted by the horn of an ultrasonic transducer assembly.

FIG. 12 is a perspective view of the horn, showing serrations on the tip of the horn; these serrartions serve to enhance the fusion of the thermoplastic materials being joined.

FIG. 13 is an enlarged sectional view of the horn tip shown in FIG. 12.

FIG. 14 is a plan view of one surface of the tip, showing a preferred type of serration.

FIG. 15 is a partial section taken on line 15—15 of FIG. 14.

FIG. 16 is an enlarged detail of material flowing through the sealing area and showing the effects of the serrations upon the welding.

FIGS. 24, 26, and 28 show different horn widths, and respective FIGS. 25, 27, and 29 show how the non-uniformity of longitudinal movement of the horn tip increases as the width increases.

FIGS. 30, 32, and 35 show prior art designs of horns used to alleviate the non-uniformity problems shown in FIGS. 24 through 29; and FIGS. 31, 33, and 36 show how the lack of uniformity has been corrected by the designs of FIGS. 30, 32, and 35.

FIG. 34 is an end elevation of the horns of FIGS. 24, 26, 28, 30, 32, and 35.

FIG. 37 is a perspective view of a modification capable of making a double seal, i.e., a weld having an unwelded portion at its mid-point, that can be used to detect leaks resulting from defective weld areas.

FIG. 38 shows the method of using the double seal of FIG. 37 to detect such leaks.

FIG. 39 is a plan view showing a loss of overlap of two sheets being joined; and FIG. 40 is a detail of the nip disclosing the method by which the end of an overlap can be detected.

FIGS. 23, 39 and 40).

DETAILED DESCRIPTION OF THE INVENTION

The method and apparatus of my invention may be used for joining together, i.e. welding, sheets of thermoplastic material to form large air and watertight sheets of predetermined size and configuration. These large sheets may be used for such purposes as forming settling basins, water storage basins, hazardous waste storage containments, canals, and for covers for basins, landfills, dump sites, stored materials, and the like.

By the term "thermoplastic material", I refer to both thermoplastic and thermosoftening materials. This would include, among others, sheet materials such as polyethylene, polypropylene, polyamide, and polyvinyl chloride. Normally, these materials are between about 0.010 and 0.150 inches in thickness.

Figure 1:
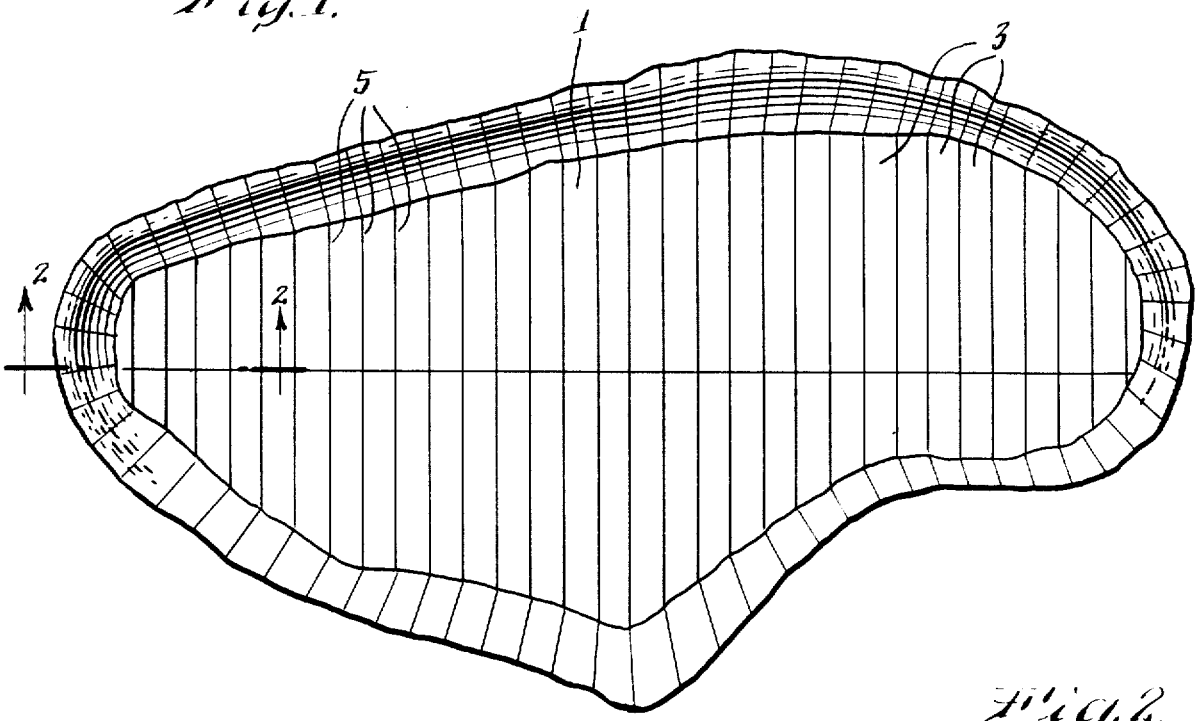
FIG. 1 is a plan view looking down on a sheet of thermoplastic material which has been formed by the welding together (joining) of individual sheets of material by the apparatus and method of my invention.
Figure 2:
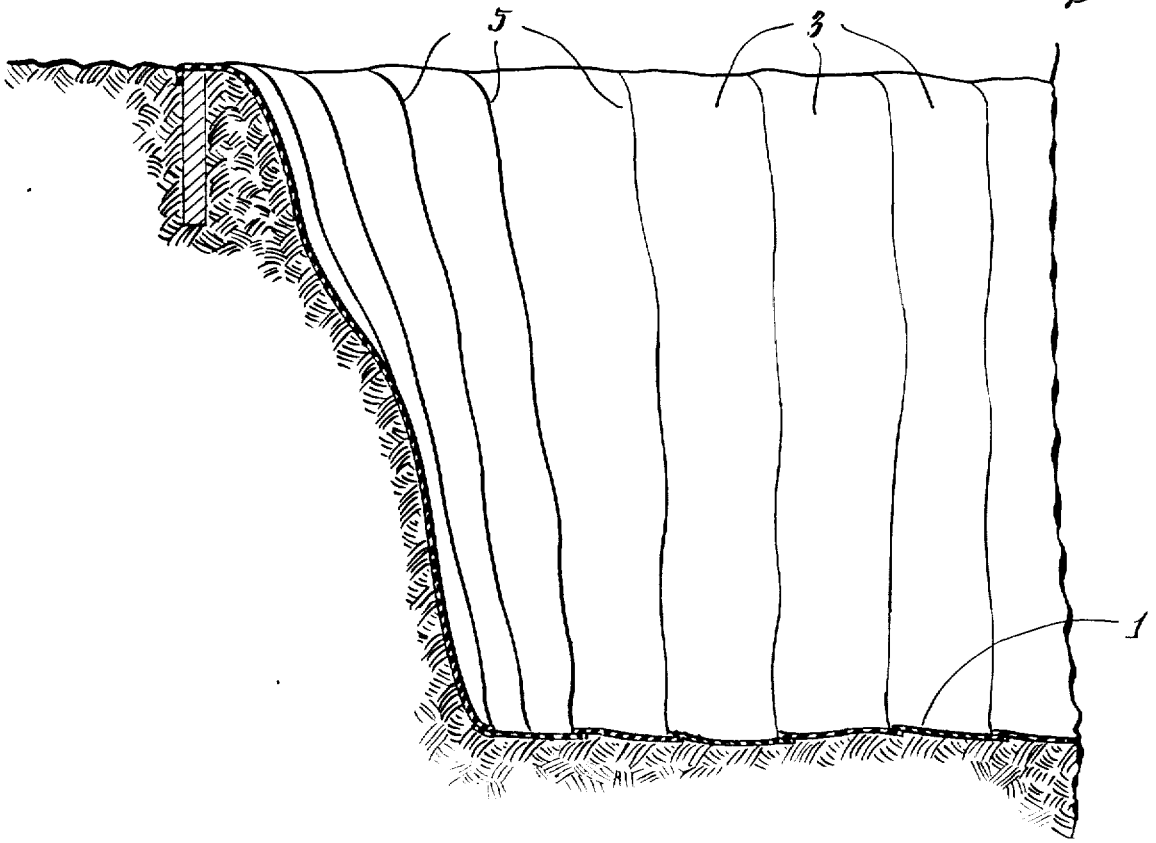
FIG. 2 is a partial section showing the formed sheet used to line a pond. The lined pond may, of course, have sides that do not have the degree of slope shown in the FIG.

FIGS. 1 and 2 show an example of a finished product 1, in this instance a water storage basin. The basin 1 is formed of a series of overlapping panels or sheets 3 of thermoplastic material which have been welded together along seam lines 5. Before welding, the panels 3 were cut to sizes and shapes such that the resulting finished product would have the desired size and configuration.

The seams 5 have been made by overlapping sheets 3 along their edges and then fusing the two layers together. The fusing is done by generating frictional heat along the seam line between the sheets sufficient to soften and melt the inner surfaces of sheets 5 to fuse them together.

The technique for welding and forming seams 5 is shown generally in FIGS. 3, 4, and 5. Two sheets 3 are overlapped, with 3a being the upper sheet and 3b being the lower sheet. Sheets 3a and 3b move from left to right (FIG. 3) and pass through nip 12 formed by nip rollers 11 and 13, one or both of which is driven. As can be seen in FIG. 3, nip 12 runs parallel to the axes of nip rollers 11 and 13.

The sheets have not been welded to the left of nip 12 (in FIG. 3), and have been welded to form seam 5 having width 7 to the right of nip 12. As can be seen in FIG. 3, the longitudinal direction of seam 5 is transverse to the nip 12.

A horn 15 with tip 17 projects most of the way into nip 12 and contacts the inner surfaces of sheets 3a and 3b (FIG. 5). The width of the tip, i.e., the direction parallel to the nip, will be the width of the resulting seam 5 (A typical seam would be about 0.3" to 3.0" wide). Preferably, the end of the tip is a straight edge running perpendicular to the longitudinal direction of the seam (i.e., transverse to the seam) and the upper end of the tip 17 is undercut, as shown at 18 in FIGS. 5 and 6. This results in most of the contact with the sheets being close to the nip.

Nip rollers 11 and 13 are mounted in drive motor housing 23. Horn 15 is carried in housing 21 which is secured to motor housing 23 by bracket 25. Electrical lines 29 and compressed air line 31 are shown entering the base of motor housing 23 (FIG. 4).

Figure 6:
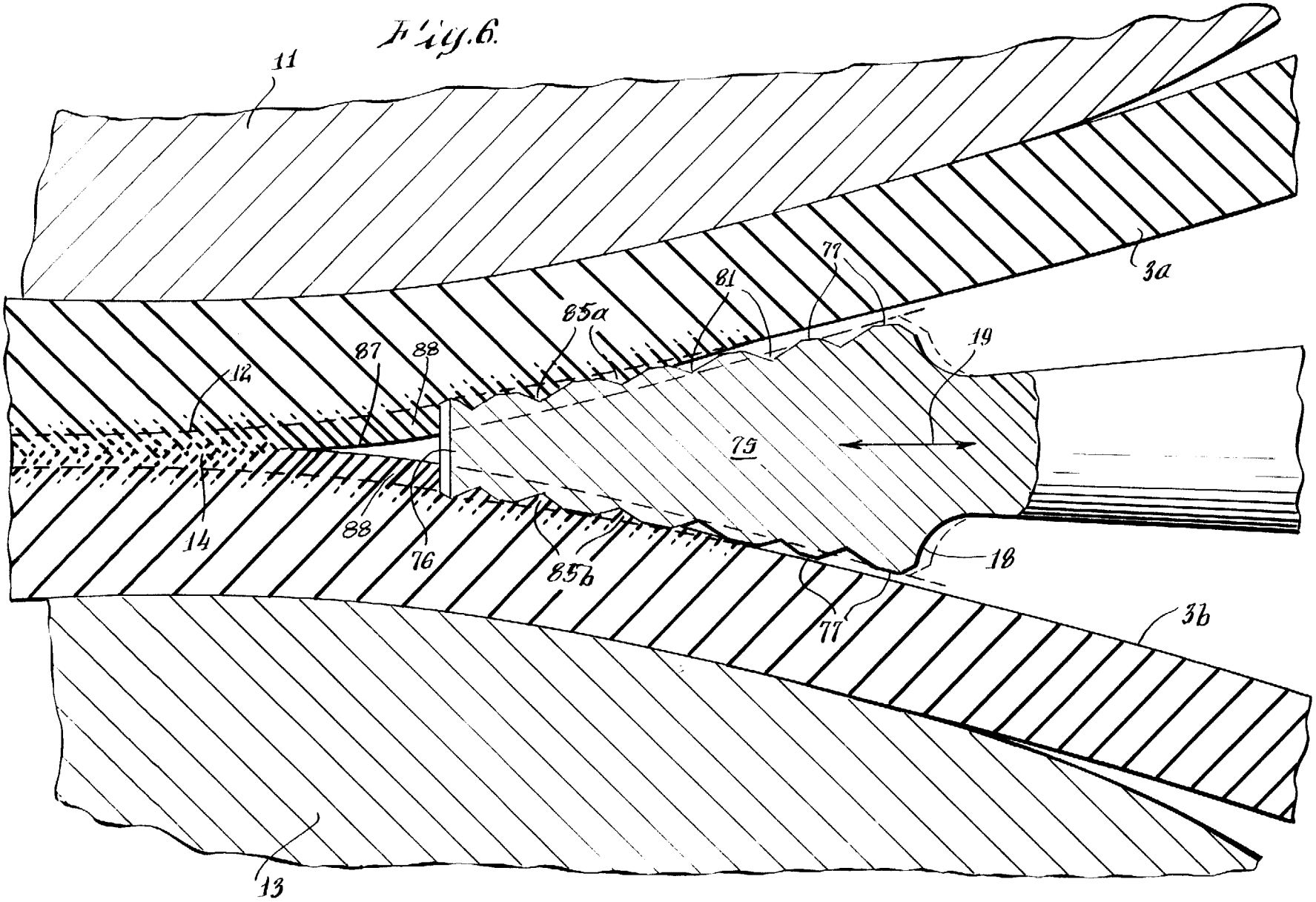
FIG. 6 is similar to FIG. 5, but more detailed. The horn is shown in two of its reciprocating positions. It should be noted that the horn reciprocates in a direction transverse to the line of the nip.

As shown in FIGS. 3, 5, and 6, horn 15 reciprocates in and out of the nip 12 in the direction shown by arrow 19. This reciprocation is in a direction parallel to the longitudinal dimension of resulting seam 5 and perpendicular to the direction of nip 12. The reciprocation, produced by an ultrasonic transducer described below, is preferably at a frequency of between 20 and 50 kilohertz. Typically, at 40 kilohertz, it produces a movement of tip 17 over a range of 0.003 to 0.004 inches.

In use, tip 14 rubs back and forth against the inner surfaces of sheets 3a and 3b where they approach nip 12. This motion produces frictional heat sufficient to melt the inner surfaces. This results in the melted areas intermixing as they approach the nip 12 and welding together as they cool.

The rate of rotation of nip rollers 11 and 13, and so the linear rate of movement of sheets 3a and 3b, should be such relative to the amount of heat produced by tip 17 that the sheets will fuse adequately to properly weld, but not fuse more of the sheets than is necessary. By way of example, if two 0.020 inch thick sheets of polyethylene are being welded using a tip moving 0.004 inches with a frequency of 40 kilohertz, the linear speed should be between about three and four feet per minute.

The Welding Horn

The nature and direction of motion of the welding horn are important for obtaining welded seams that are over one-quarter inch across—wide enough to give desired strength—and of uniform strength across the width of the weld.

Figure 8:
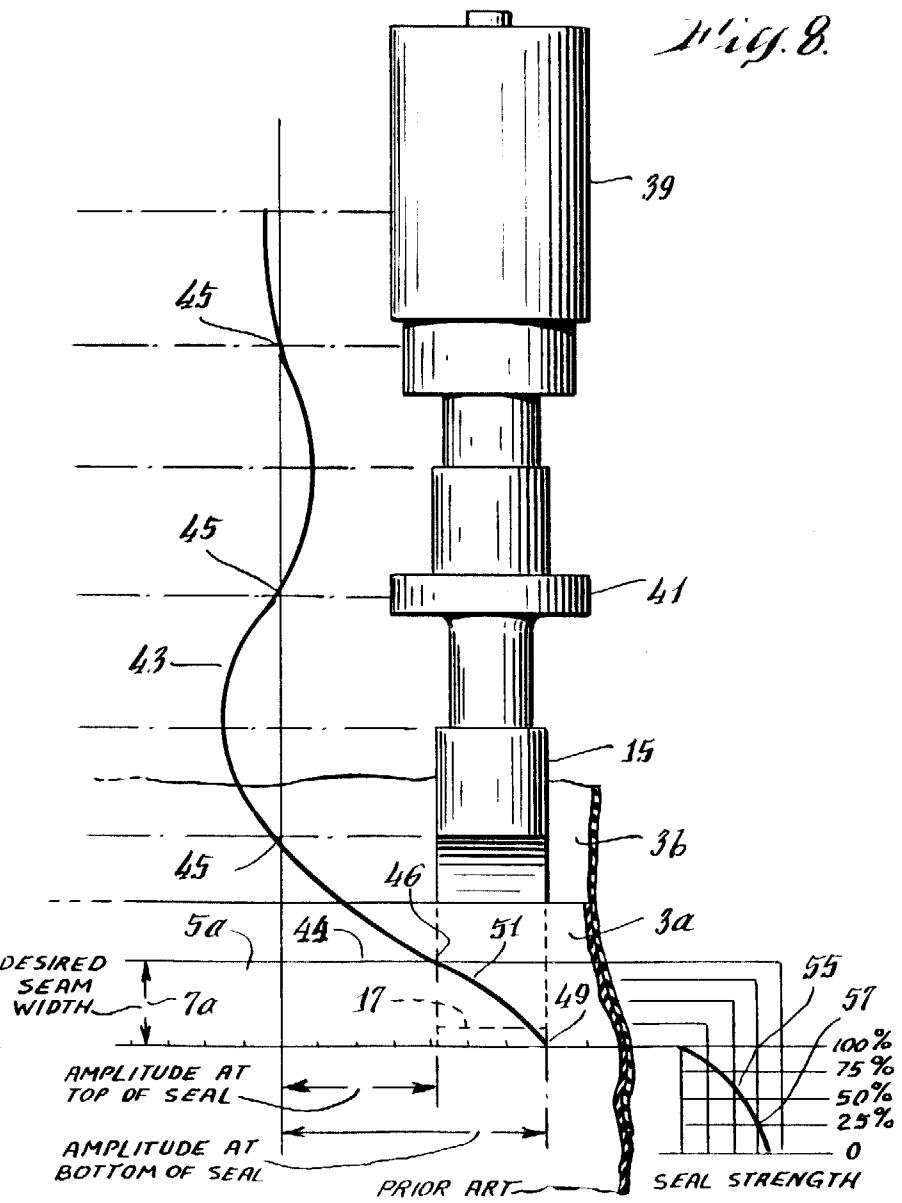
FIG. 8 is a peak velocity (amplitude) distribution curve showing how the velocity of motion, in a longitudinal direction, varies from the end of the horn to points removed from the end. It illustrates the cause of non-uniform seal strength resulting from use of prior art welding methods in which the horn was so positioned as to move parallel to the nip of the joining rollers.
Figure 7:
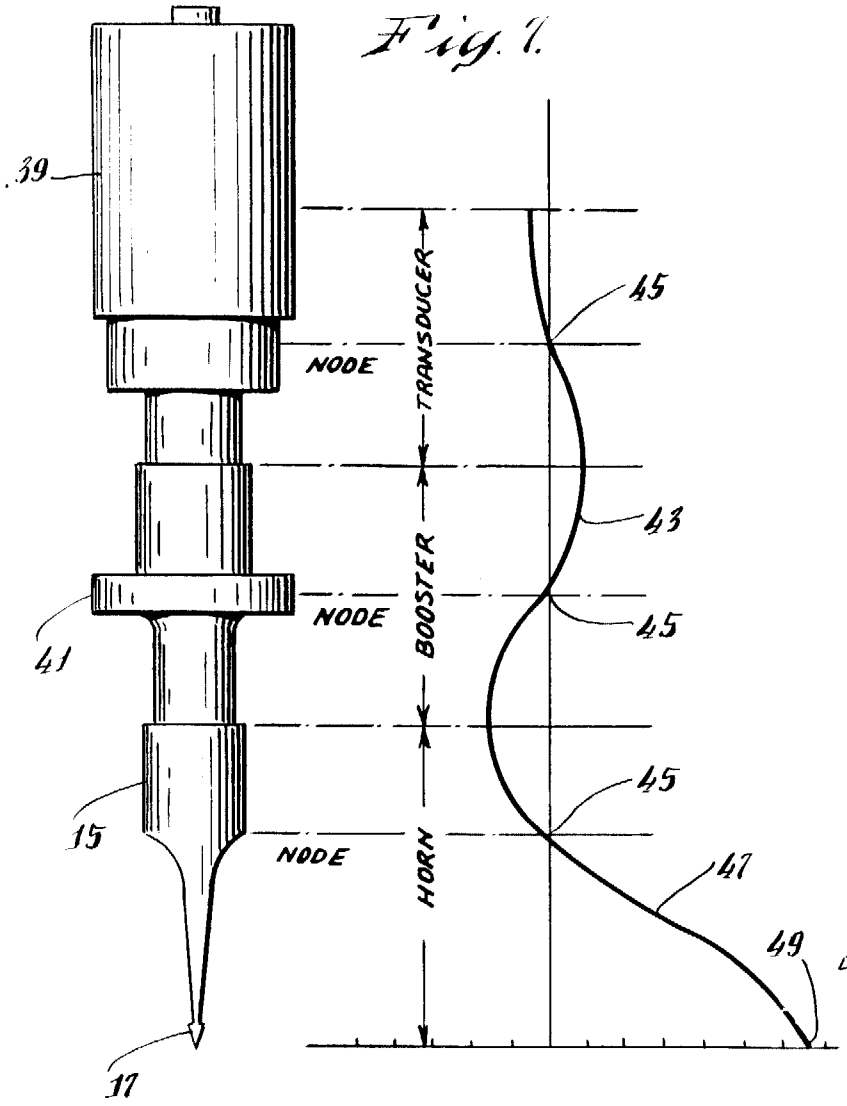
FIG. 7 is an amplitude distribution curve positioned beside a transducer-horn assembly, showing the extent of longitudinal motion of different sections of the horn resulting from longitudinal motion of the ultrasonic transducer.
Figure 9:
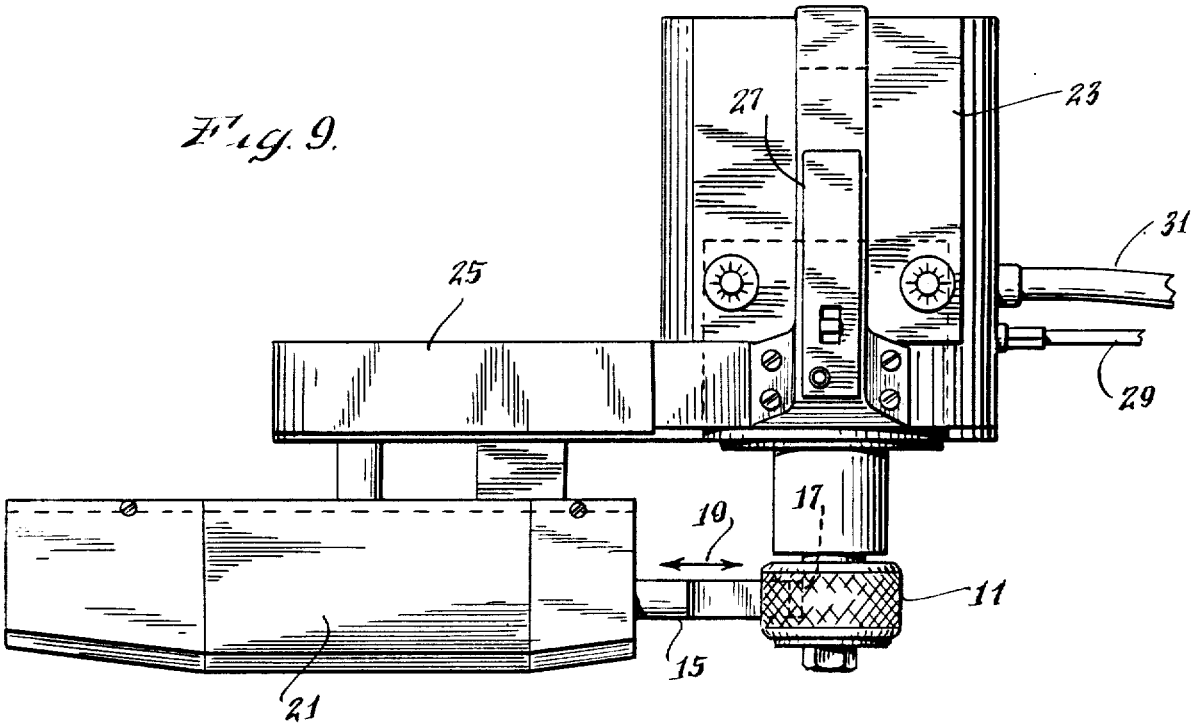
FIG. 9 is a plan view of one form of my invention.
Figure 10:
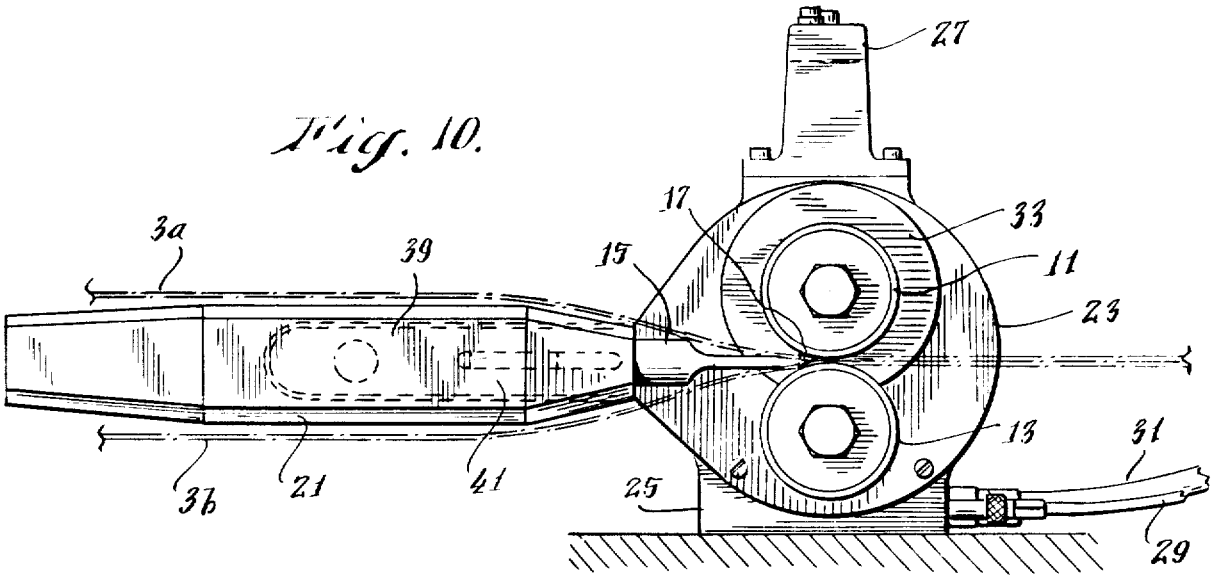
FIG. 10 is a side view of the form of my invention shown in FIG. 9.

Details of the horn 15 and the effect of the direction of its motion relative to the seam are shown in FIGS. 7 and 8. The tip 17 of the horn 15 is shown enlarged in FIG. 6, with more details being shown in FIGS. 12 through 16. Structural modifications of the tip to provide more uniform motion are given in FIGS. 24 through 36.

FIGS. 7 and 8 disclose details of the welding tool. It includes driving transducer 39 (normally an ultrasonic transducer), mechanical transformer or booster 41, horn 15 and tip 17; and curves showing the amplitude of motion of the various parts are alongside the drawings of the tool. Transducer 39 vibrates in a direction lengthwise of the tool and so transmits tension and compression along its length. The energy is first transmitted to booster 41 which, through mass transformation, amplifies the longitudinal distance through which the reciprocating vibration occurs. This motion is then transmitted to horn 15 which imparts additional amplification to the motion of the tip 17. Consequently, tip 17 has greater velocity than any of the elements which drive it.

The curve (graph) 43, beside the tool in FIG. 7, shows the amplitude of the motion on its horizontal axis. It has three nodes 45, one each in the transducer 39, the booster 41, and the horn 15. As can be seen, the amplitude is greater following booster 41 than before it, and is greatest at tip 17, shown by point 49 on curve 43. As one moves upwardly up horn 15 from tip 17, the amplitude rapidly decreases, as shown by portion 47 of the curve.

Since the greatest amplitude of motion of the horn is at the tip 17 and the the amplitude drops rapidly away from the tip, the greatest velocity, i.e., work capability, is at the tip, and, so the greatest amount of frictional heat will be created at the tip. Therefore, by using only the tip 17 to fuse the sheets 3, seams 5 will be heated uniformly across their widths, and the widths of seams 5 can be greater. This is why I weld sheets with the end of tip 17 projecting into nip 12, its width running parallel to nip 12, and the direction of reciprocating vibratory motion of tip 17 being perpendicular to nip 12 and parallel to the longitudinal dimension of seam 5.

FIG. 8 serves to compare the nature of the weld obtained by the prior art system of Balamuth in which the tip reciprocated across the seam and parallel to the nip. The details of FIG. 8 are similar to those of FIG. 7 except in the lower portion where welding is illustrated by a partial overlay showing the effect of welding with the tip motion across seam 5a for the seam width 7a.

Since the amplitude of motion across the seam 5a is less at the top of the seam, as seen in FIG. 8, than at the bottom, less heat will be generated by friction at the top than at the bottom, and, consequently, the seam strength will vary across its width, being least at the top. This not only limits the strength of the seam, but also, as a practical matter, limits the width, normally to about one-quarter inch.

Reviewing the lower portion of FIG. 8, one sees that the bottom of seam 5a is fused by motion of the very end of tip 17. This will have the maximum amplitude at point 49 on curve 43. By contrast, the upper edge 44 of seam 5a will be fused by the heat from motion of a portion of the tip 17 that is removed from the very end. It will have an amplitude of motion as shown by point 46 at the intersection of the upper seam edge 44 and amplitude curve 43. The relative amplitudes of this example are shown at the very bottom of the Figure, the upper amplitude being some 60% of the maximum. Curve 57 shows the resulting point-by-point seal strength. Taking point 49 at the bottom of the seal as 100%, the lesser amplitude at point 51 on curve 43 shows that the seal strength at point 57 on curve 55 will be about 25% of the seal strength compared to that at point 49. This demonstrates that, since seal strength is a function of amplitude of motion, having the horn reciprocate across the seam creates a non-uniform bond.

To complete the review of amplitude variations, reference is made to FIGS. 24 through 36. Amplitudes of motion across the end of tip 17 are considered for different widths of horn 15. FIGS. 25, 27, and 29 are curves showing the variation of contraction and extension (amplitudes) for the different widths of FIGS. 24, 26, and 28, respectively, the contraction and extension curves being 24a and 24b, 26a and 26b, and 28a and 28b, respectively. As can be seen, the amplitudes are uniform across the ends of narrow tips, but, as the widths become greater, the amplitude begins to fall off at the outer edges. This can cause different rates of sealing due to different generation of frictional heat.

FIGS. 30 through 36 show a prior art method of modifying the horns (here identified as 15a, 15b, and 15c) to eliminate the amplitude variation. For somewhat wider tips, as in FIG. 30, a vertical slot 59 is sufficient and produces curves such as 30a and 30b. For even wider tips, as in FIG. 32, two slots 61 are used. This partially corrects the problem, as shown in curves 32a and 32b. Complete correction can be achieved by undercutting the center of the upper end of horn 15c where the horn joins booster 41 (FIG. 35). The resultant corrected amplitudes are shown in curves 35a and 35b.

The Serrated Tip

The speed and quality of the welding can be improved by having tip 17 serrated or knurled. The serrated tip 75 is shown in FIG. 12 and, enlarged and in section, in FIGS. 6 and 13. See also FIGS. 14, 15, and 16.

Serration of the tip serves three functions. First, it abrades the surfaces to be fused and, so, disrupts surface contaminants. Second, it results in greater friction and so more efficient heating. Third, it causes the melt of the two inner surfaces to intermix, thereby creating a stronger bond.

The pattern of the serrations may take any of various forms. My preferred form is shown in plan view in FIG. 14. It consists of a pattern of diamond or rhombic lands 77, with the sides of the lands 77 having an angle to the length-wise dimension of the horn of about 30° and a horizontal spacing of about 0.035". The pattern includes depressed channels or striations 81 running between the rhombi. The serrations may have any other desired pattern which will serve to cause the desired intermixing.

The end of the tip 17 may be undercut, as shown at 18 in FIGS. 5 and 6, to permit the tip to enter farther into the nip, and so to create a stronger intermix zone.

The value of using a serrated tip 75 is shown in FIG. 16 and in enlarged section in FIG. 6. The latter figure, in particular, gives details of the frictional and intermixing effects.

As sheets 3a and 3b approach nip 12 (FIG. 6), their inner surfaces are abraded by the diamonds or rhombi 77 as the tip 75 reciprocates in the direction of arrow 19. (See the dotted outline for the alternate positions of the tip). This serves to break up any contaminants which might affect the strength of the weld and, also, creates greater friction and, so, greater melting. The heat causes the surfaces to melt and the rhombi 77 alternately direct the molten material into adjacent channels 81 on the surface of sheet 3a forming ridges of melt 85a, and that of sheet 3b, forming ridges of melt 85b.

As the reciprocation continues, the ridges 85a and 85b work their way down the tip in channels 81, from diamond 77 to diamond 77. The fused material in converging channels is mixed and is redirected a series of times, as it works its way towards tip 17, thus being further intermixed. When, it reaches the tip, the material leaves the tip and the molten ridges 88 from the two sheets are further intermixed by the motion of the end 76 of tip 75 plus the squeezing action of the nip rollers. As a result, the ridges blend together or intermix, at point 87 for a strong weld as the two sheets 3a and 3b pass through nip 12.

This intermixing results in the formation of a fused intermix zone 14 which provides greater strength to the weld. This intermix zone is made up of a mixture of the material from the surfaces of both sheets 3a and 3b. The zone has a uniform welded strength across the width 7 of the seam because the tip has reciprocated in a direction longitudinally of the seam, for reasons previously described. There may be other methods to weld a seam having a uniform intermix zone, but the above one is believed to be the best presently known.

The product which results from welding the various sheets together is a large sheet of thermoplastic material of a predetermined size and configuration, such as the sheet shown in FIGS. 1 and 2. It has overlapping seams which are of uniform strength across the bonded area, the seams having a uniform intermix zone.

The Welding Systems

Three welding systems are shown: the first (FIGS. 4 and 9 through 11) for a fin-type seal; the second, for lap-type sealing, (FIGS. 17 through 19) includes a tricycle carriage and has a driven upper roller; the third (FIGS. 20 and 22) is essentially the same as the second, except that it includes a driven lower roller as well. The use of a second driven roller helps to avoid possible skewing of the sheets during welding.

The unit of FIGS. 4 and 9–11 is intended to be hand-held during operation. It includes a drive motor housing 23 carrying motor 33 which drives upper nip roller 11 and also carrying lower roller 13. A compressed air supply 31, or other control means, is used for moving horn 15 into and out of nip 12 by use of piston 37, described below. Arm 25 holds housing 21 containing transducer 39, booster 41, horn 15, and its tip 17.

Figure 11:
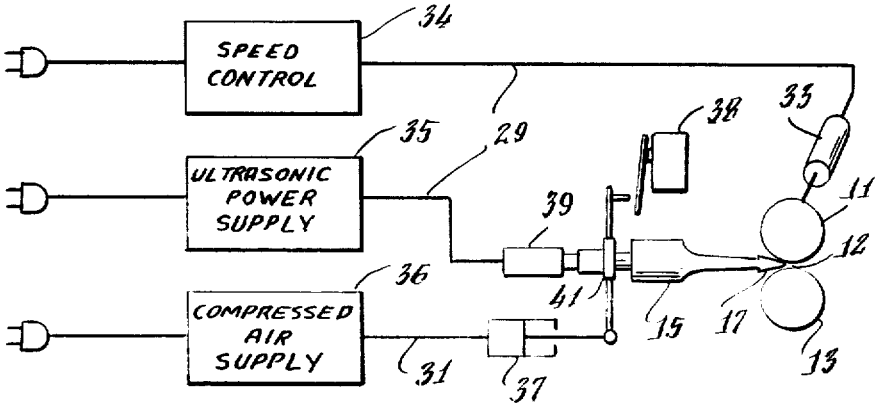
FIG. 11 is an electrical and pneumatic schematic diagram for use with the apparatus of FIGS. 9 and 10.
Figure 41:
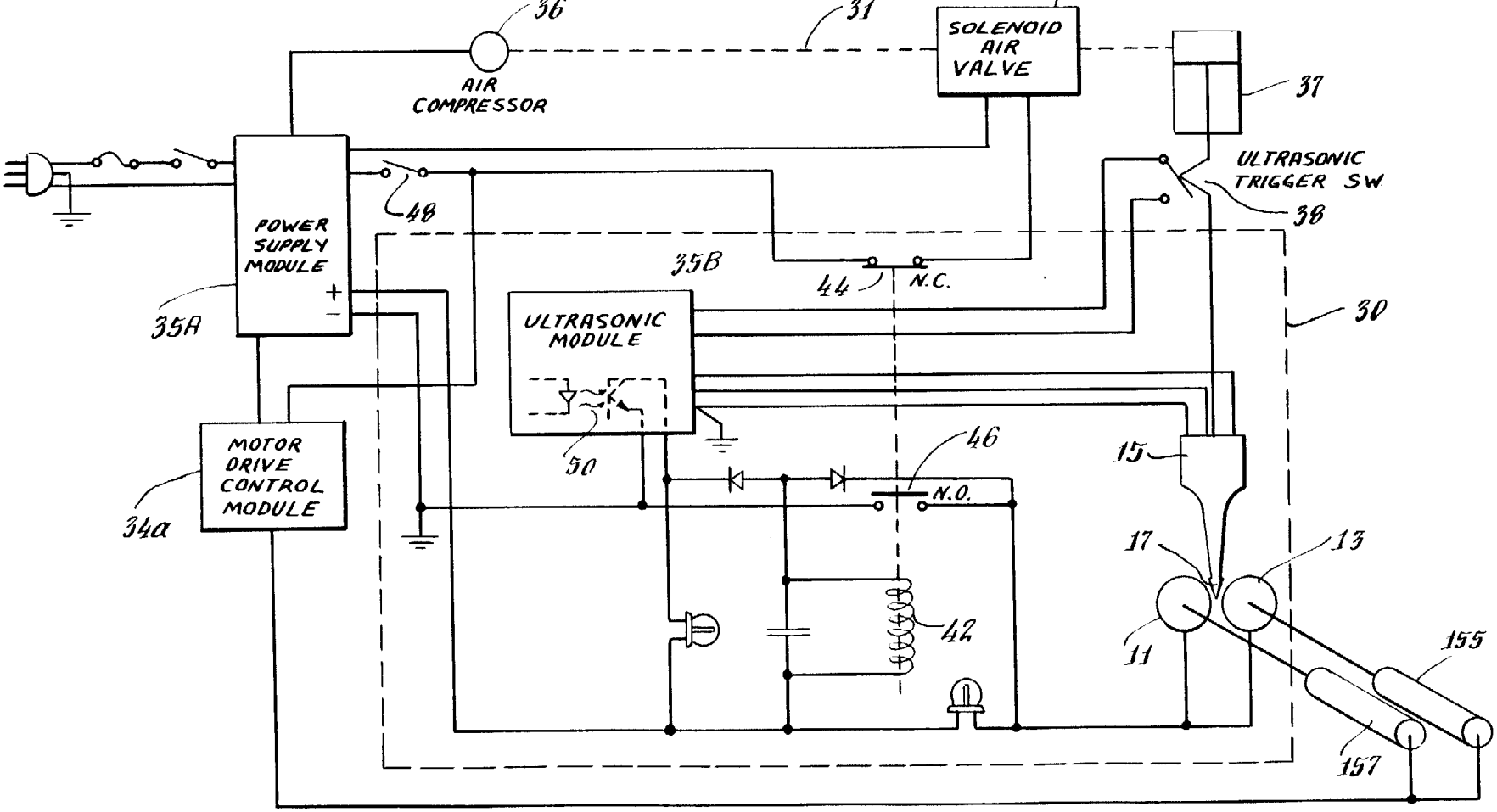
FIG. 41 is a schematic circuit for detecting signals resulting from ultrasonic malfunction and for detecting contact of the joining roller and the horn (which occurs when there is loss of overlap.

The control circuit is shown schematically in FIG. 11 (See also FIG. 41). It includes a speed control 34, an ultrasonic power supply 35, and a source of compressed air 36. The compressed air serves to drive piston 37 to move horn 15 and tip 17 to or from the nip 12. It also serves to close interlock switch 38 when horn 15 is in the nip, thus actuating power supply 35 and upper roller motor 33, so that welding can commence. Reversal of the piston's motion stops the operation.

As mentioned, the second embodiment (FIGS. 17–19) includes a tricycle mounting and a driven upper roller. The tricycle mounting is defined by double "front" wheels 101, "left" side wheel 102, and "right" side wheel 103. Actually, relative to the direction of motion of the sheets 3a and 3b, wheel 101 is in the rear.

Wheel 102 is mounted on arm 105. The central portion of arm 105 runs longitudinally of the direction of motion of the sheets. It has one inwardly-directed end 106 that is secured to the bottom of horn assembly housing support 20 and the outer support strut 22. Its other end 107 is inwardly-directed to vertical support bracket 109 which holds lower roller 13.

Wheel 103 is secured to arm 106, which extends beneath arm 113. Arm 113 is secured to the upper ends of the outer support strut 22 and to the horn assembly housing support 20. Arm 113 is L-shaped and has arm 115 which runs longitudinally (and slightly upwardly) from its connection with the housing support 20 to a pivot 122 connecting arm 115 with pivotted upper roller assembly 117. Assembly 117 includes pivotted arm 121 on pivot 122 carrying upper roller 11, and upwardly-extending motor bracket 123. Slidable locking pin unit 129, when engaged, serves to hold assembly arm 117 fixed in its operative (down) position. Motor 125 with its gearbox 126 are secured to bracket 123 in such a position that a chain or belt 127 can connect the gearbox 126 with upper roller 11 in order to drive it.

Housing 21 (FIG. 18) carries horn 15, booster 41, and transducer 39, all so positioned as to place tip 17 in the nip 12. (This is similar to FIG. 4). It includes a single-acting piston 135 in the rear. Piston 135 includes return spring 137 and is connected to a source of compressed air through air hose 139. Thus, when air presssure is applied, tip 17 (or 75) will be in the nip; when released, it will be retracted.

A housing 143, carrying the necessary electrical circuitry, is secured to arm 113. The various compressed air connections and valves 145 are positioned on the outside of the housing. These include the manual air valve 147 to control air pressure through air hose 139 leading to piston 135. An adjustable mechanical stop 148 is mounted in a position to engage a flange 149 extending from the horn. This serves to limit the motion of the horn towards the nip.

To operate this second embodiment (FIGS. 17–19), one first pivots the upper roller assembly upwardly and actuates valve 147 so that tip 17 retracts from nip 12. (Dotted lines in FIG. 18). The lower sheet 3b is then passed under wheel 103, under housing 21, and under the inward portion of arm 106. As it passes towards the nip 12, it goes above arm 107 and above lower roller 13 into the nip. Upper sheet 3a passes over piston 135 and housing 21, and under arm 115 and upper roll assembly 117, into nip 12.

Assembly 117 is lowered and locked into place with locking pin unit 129; and piston 135 is actuated, so that tip 17 enters the nip 12.

Upon then starting the unit, the driven roller 11 is caused to rotate by motor 125 and gear box 126 through chain 127, and tip 17 reciprocates next to the nip 12, as above described, to melt the sheet surfaces and so weld the sheets together.

Figures 17, 18:
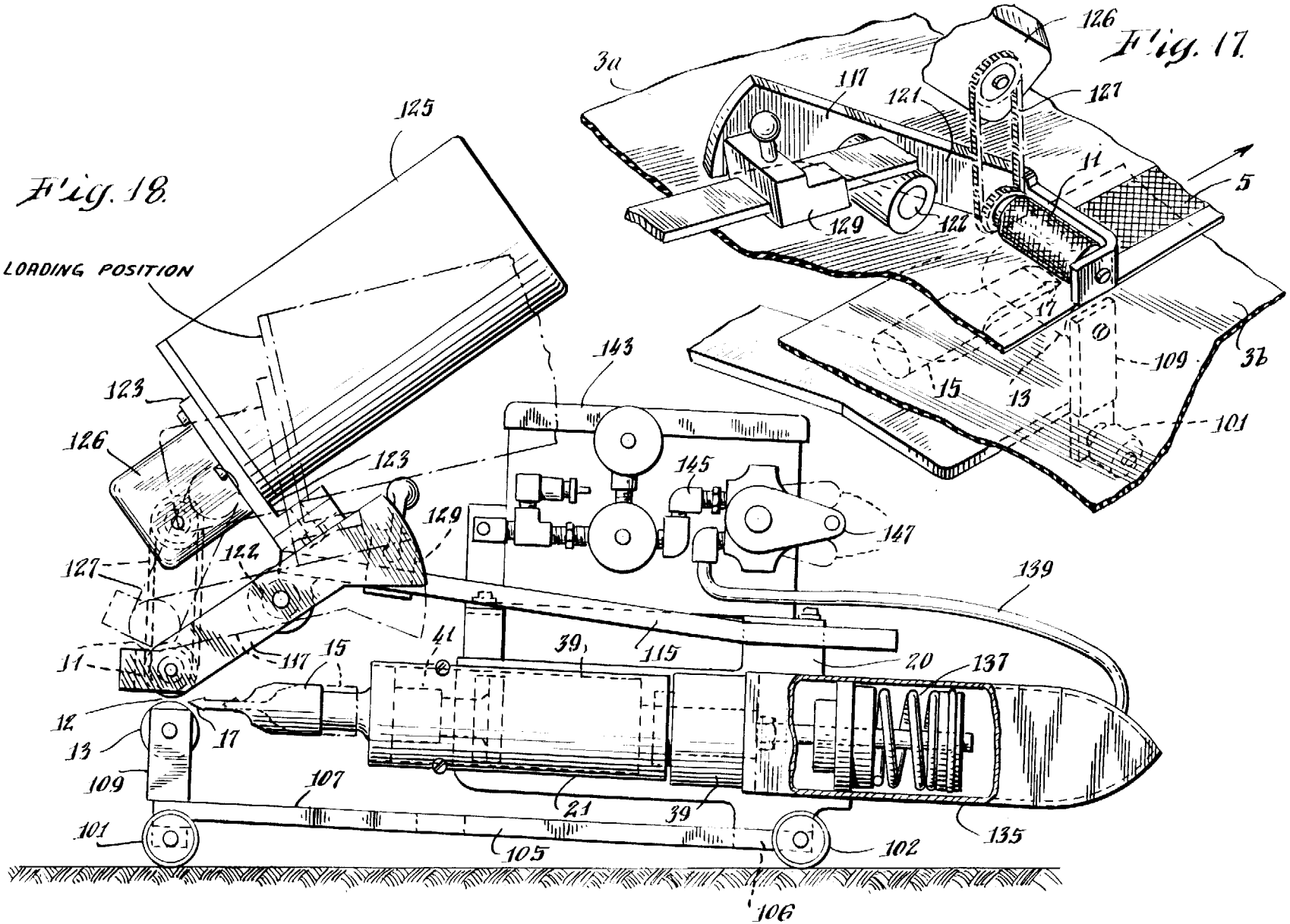
FIG. 17 is a partial perspective view of first modification of my invention.
FIG. 18 is a side elevation, partially cut away, of the modification of FIG. 17.
Figure 19:
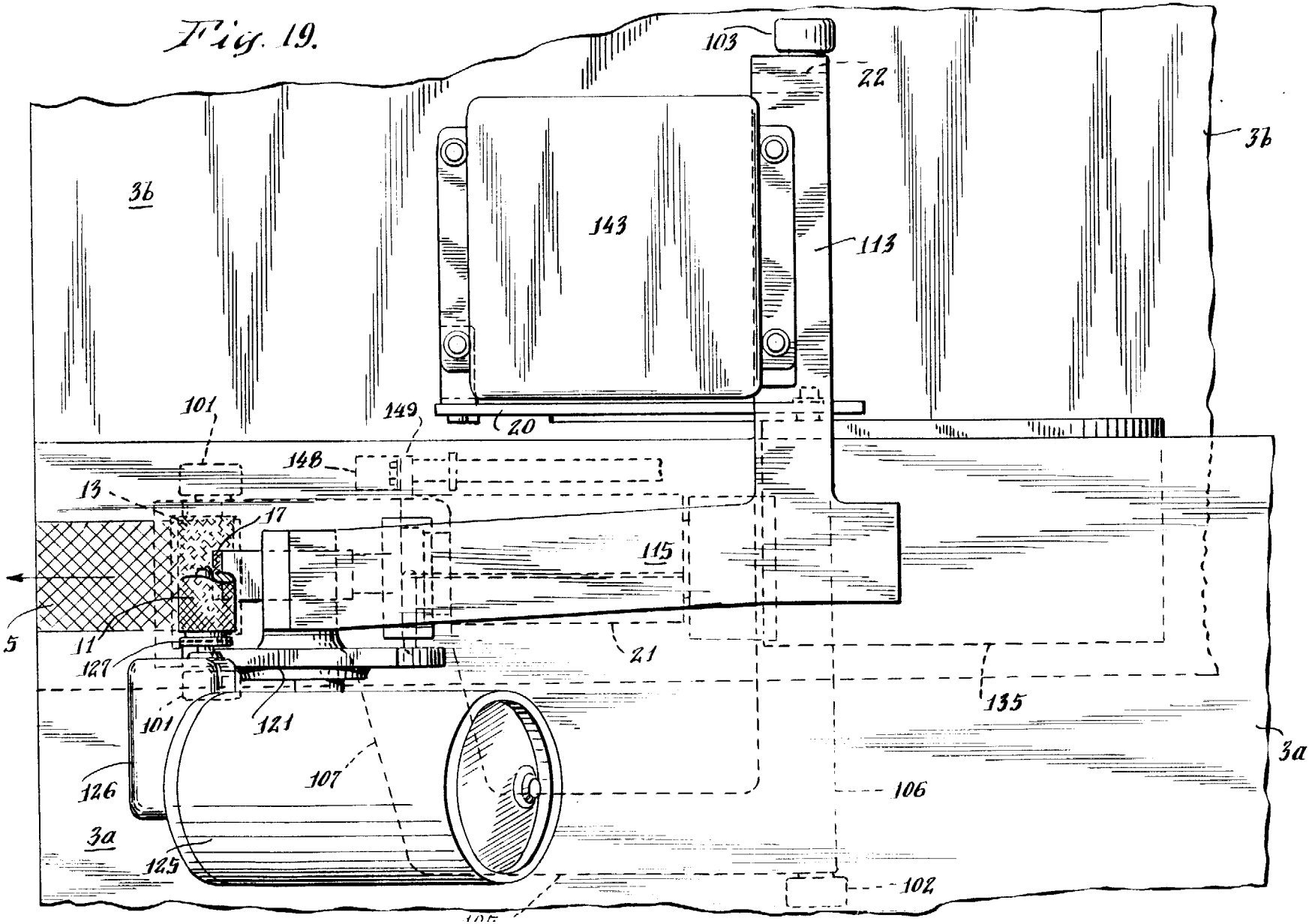
FIG. 19 is a top plan view, partially cut away, of the modification of FIG. 17.

Driven roller 11 causes relative movement between the sheets being welded and the entire tricycle-mounted system. Normally, since the sheets are in fixed positions and the system is mounted on wheels, this will result in the welding system itself moving while the welding is taking place. The unit would move towards the right as seen in the drawings of FIGS. 18 and 19.

Figure 20:
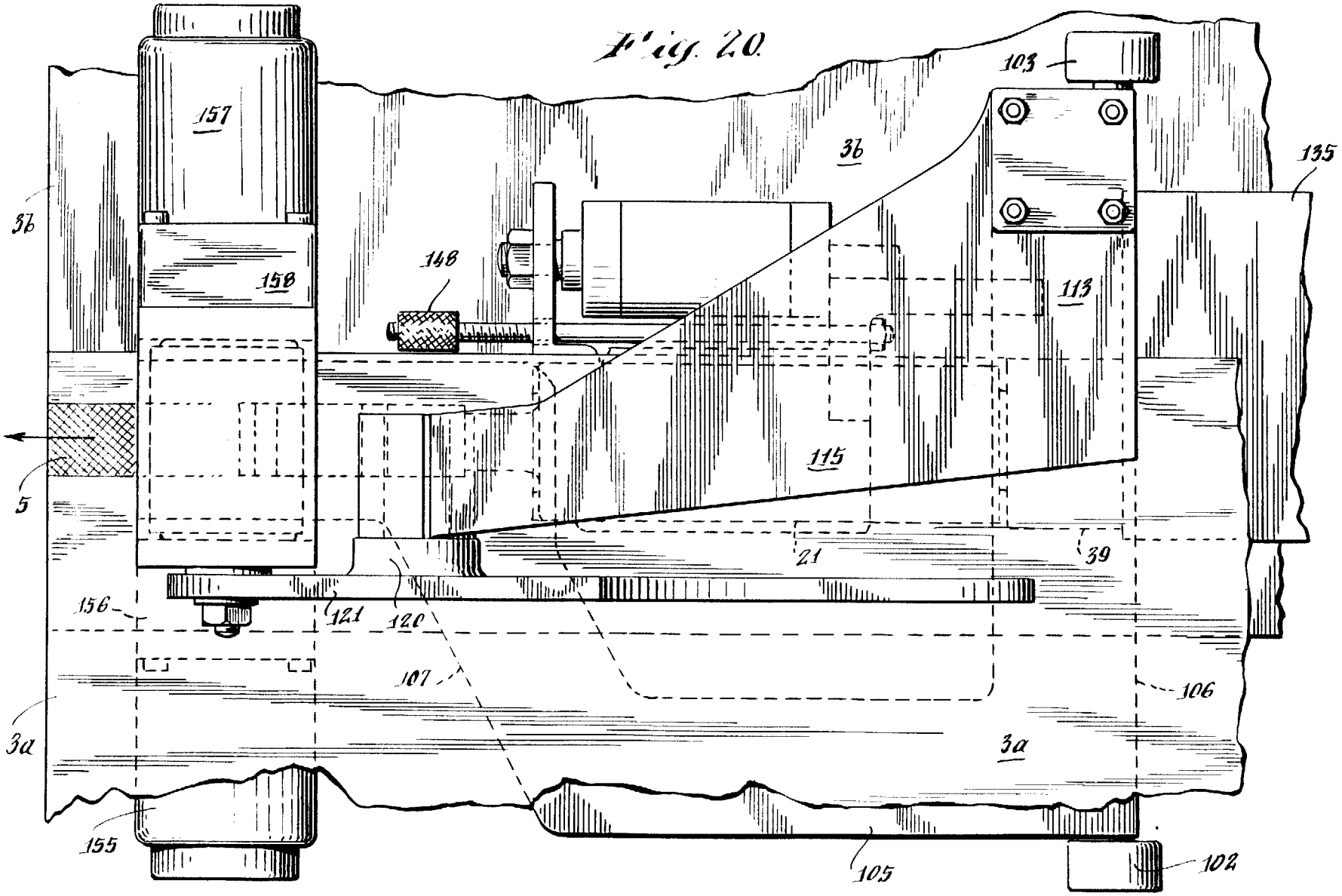
FIG. 20 is a top plan view of a second modification of my invention.
Figure 21:
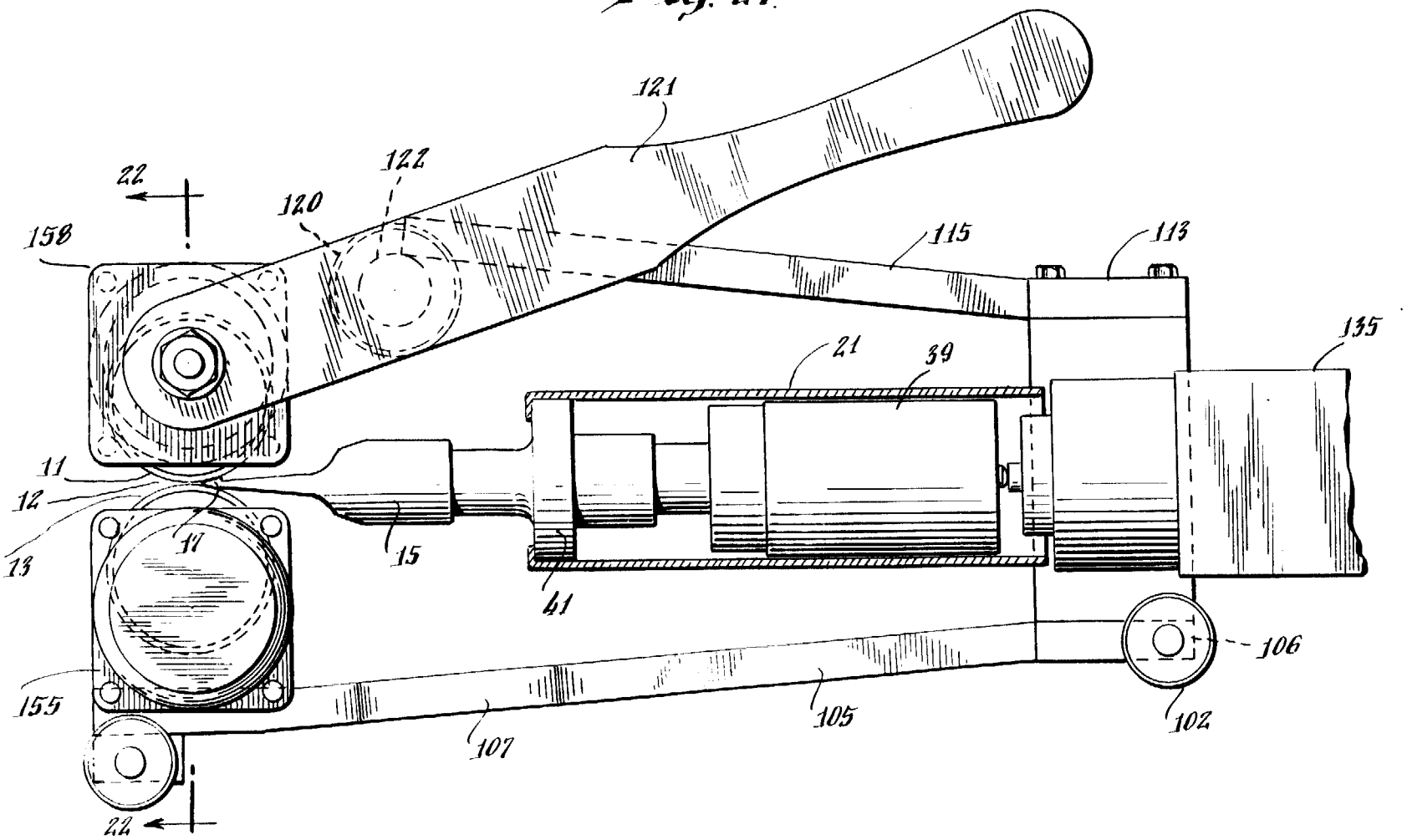
FIG. 21 is side elevation of this second modification.
Figure 22:
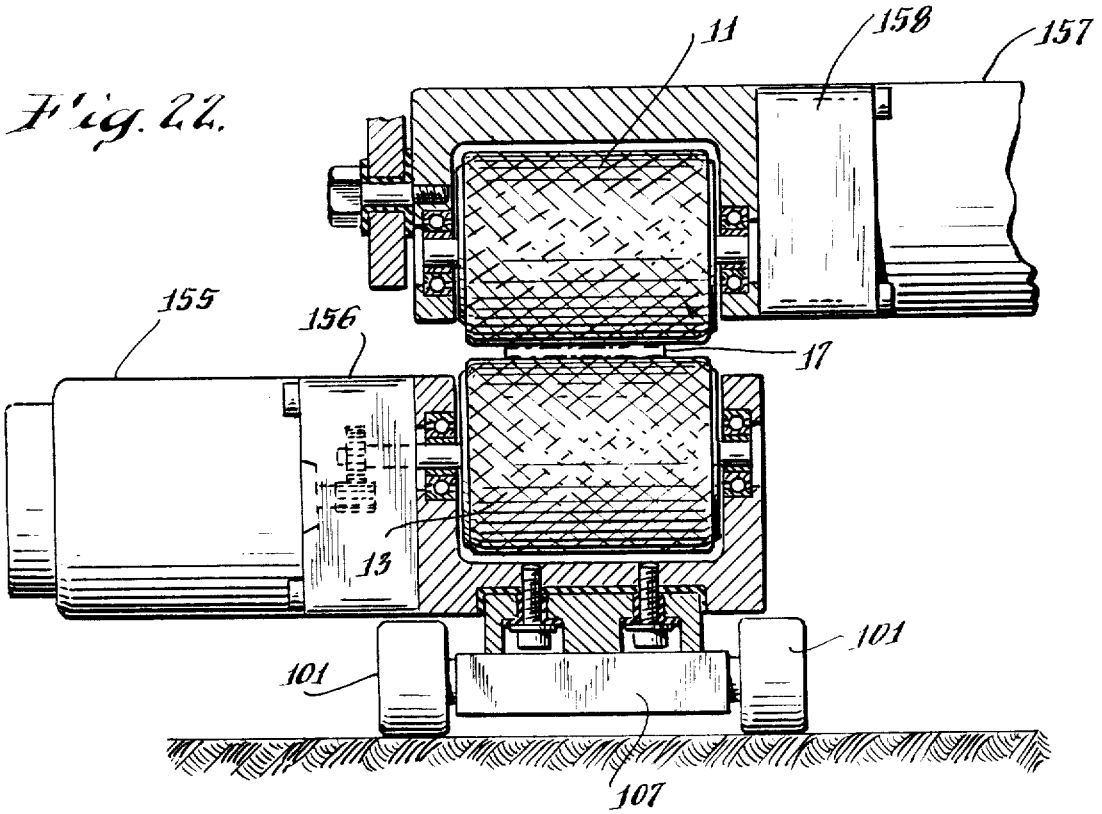
FIG. 22 is a section taken on line 22—22 of FIG. 21.

I turn now to the third embodiment (FIGS. 20–22). As mentioned, it is similar to the last-discussed one, except that it has two driven rollers. Therefore, it needs to be described only with reference to the changes.

The unit has two motors, 155 associated with lower roller 13, and 157 associated with upper roller 11. Each may also have such gearing as is needed for the desired resultant speed. Lower motor is secured to arm 105 and remains in fixed position. Upper motor 157 must, however be able to raise in order to open the nip, and so is mounted on pivotted arm 121.

Since the two rollers are both driven and operate together, electrical speed control means and trimmers must be provided to assure operation at the same speed. Otherwise, skewing of the sheets 3a and 3b may result. (One cannot easily gear the two rollers together, since there must be room on one side of the nip to permit access of one of the sheets to be welded and, on the other side, to permit access for the other sheet; see FIG. 22).

Rollers 11 and 13 are electrically isolated from the main frame, so as not to be grounded, for purposes to be described below.

Protective Systems

There are circumstances in which it is necessary for the apparatus to stop operation in order to protect the quality of the product. In particular, this is desireable when the sheets get skewed and when one runs to the end of one sheet. An example of a skewed sheet is found in FIGS. 23 and 39; of a loss of sheet material, in FIG. 40.

These circumstances can be detected simply, because, when they occur, contact will be made between the tip 17 and one or the other of the rollers 11 and 13. This, then, can be used to close a circuit and so actuate a shut-off system.

Figure 23:
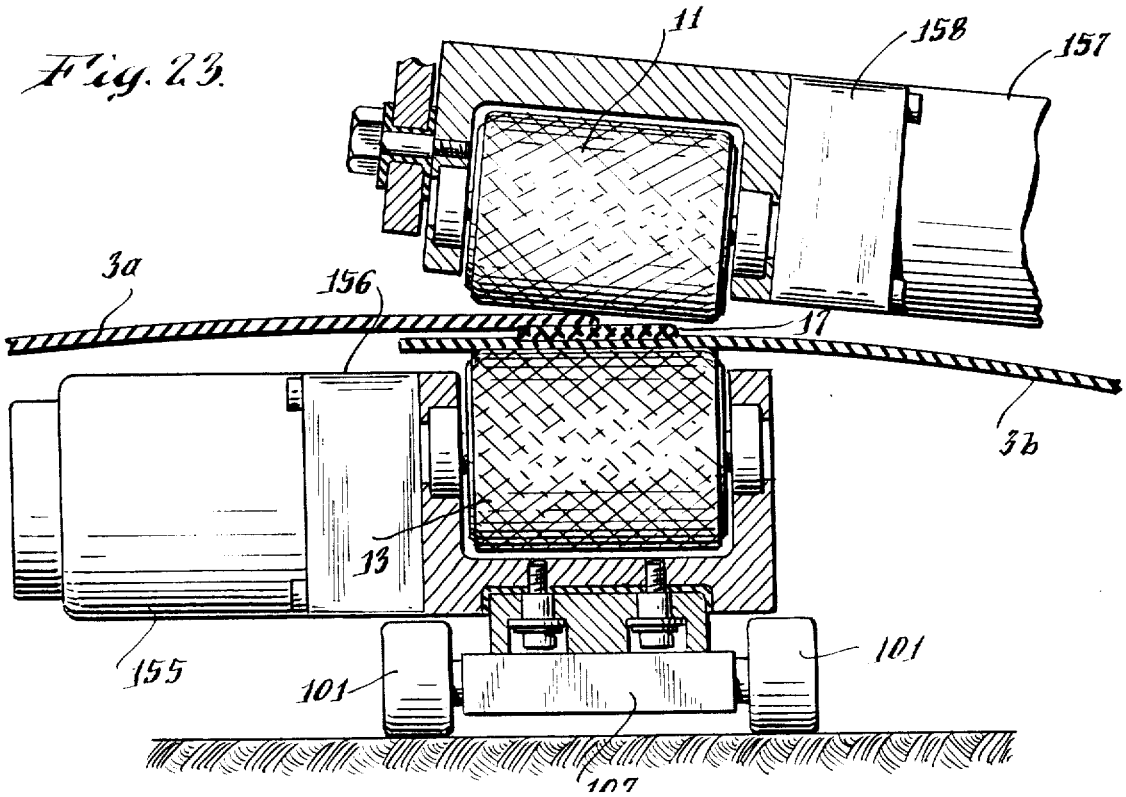
FIG. 23 is similar to FIG. 22, but showing loss of overlap causing roller tilt and contact with the horn.

FIGS. 23 and 39 show skewing. As can be seen, especially in FIG. 23, skewing results in one or the other of the rollers contacting the tip resulting in a closed circuit. This system works even more efficiently if the rollers are so mounted that they will tilt towards the tip if the material skews out of place.

Likewise, running out of a sheet will close a circuit. FIG. 40 shows how, when the top sheet 3a runs out, the tip 17 will contact the top roller 11. If the bottom sheet 3b had run out, contact would be made with the bottom roller 13.

A further circuit shuts off the operation when there is a fault within the ultrasonic module 35b or elsewhere within the ultrasonic system. The fault activates an optical coupler 50 which grounds solenoid 42, thus shutting down the system.

A circuit to control the third embodiment is shown in FIG. 41. It is very similar to that shown in FIG. 11, except more detailed and including a motor control for two motors.

There is another method of ensuring a good weld. That is by using a double seal with an air channel between the seal sections and then testing the ability of the channel to hold air under pressure. This is shown in FIGS. 37 and 38.

A wide horn 15c and tip 17 are used with split upper and lower rollers 211 and 213, that is, with a gap in the middle of each one, such as gap 212 in roller 211. Then, when the weld is made, there will be no nip opposite the gaps, and an unwelded air channel 221 will remain. The weld can then be checked by sealing off its ends and inserting a needle 223 carrying compressed air into the channel. If there is no leakage, the welds are tight and strong.

The Circuit

Power first enters power supply module 35a. As AC power it goes to the air compressor 36 and the motor drive control 34a. Rectified power goes to the ultrasonic module 35b and to the fault detection circuit 30 which includes circuit 50. The compressed air goes to solenoid air valve 40 and then to control piston 37. The motor drive control module 34a supplies power to and synchronizes the speeds of motors 155 and 157. This synchronization is achieved by trimming means built into the controllers.

Upon actuation of the unit, piston 37 drives tip 17 of horn 15 into the nip 12 formed by rollers 11 and 13. It also closes ultrasonic trigger switch 38, thereby actuating ultrasonic transducer 39 to give the necessary reciprocating motion to the horn 15.

The fault detect circuit 30, to stop the operation in the event of skewing or end of sheet, is controlled by solenoid 42, which is actuated in the event tip 17 touches either roller 11 or roller 13. Solenoid 42 is in the circuit of valve 40 via contacts 44 which are normally closed. If the tip 17 touches one of the rollers 11 or 13, it grounds one side of the solenoid 42 and, since the other side is positive, actuates it. This breaks the circuit to valve 40 and so shuts the unit down. Another set of contacts 46, normally open, are simultaneously closed, so that solenoid 42 remains activated until the fault is corrected. At that time, start switch 48 is briefly opened to release the solenoid latching circuit and to reset the operation of the system.

As stated above, a further circuit shuts off the operation when there is a fault within the ultrasonic system.

I claim:

1. Apparatus for welding sheets of thermoplastic material together along proximate edges of said sheets to form a welded seam, said apparatus including a supporting frame, a pair of joining rollers mounted on said frame, said rollers having parallel axes and forming a nip therebetween, said nip having an axis parallel to said axes, driving means to drive at least one of said rollers, a horn having a tip and means to reciprocate said horn and said tip in the longitudinal axis of said horn, said horn being carried by said frame with said tip in said nip and positioned such that said reciprocation is in a direction transverse to the axis of said nip, whereby proximate edges of said sheets may move through said nip with one said edge on each side of said tip, be melted on their surfaces by frictional energy created by said reciprocal motion of said tip, and thereafter be pressed together in said nip.

2. Apparatus as set forth in claim 1 in which said means to reciprocate said tip is an ultrasonic transducer.

3. Apparatus as set forth in claim 2 in which the frequency of reciprocation of said transducer is between about 20 and 50 kilohertz.

4. Apparatus as set forth in claim 2 in which said means includes a booster between said transducer and said horn.

5. Apparatus as set forth in claim 1 in which the leading edge of said tip is a straight edge and is perpendicular to said direction of reciprocation and parallel to said axes.

6. Apparatus as set forth in claim 5 in which said tip has at least one slot running transversely to said straight edge, said slot being so dimensioned as to reduce variations in amplitude of motion along said edge.

7. Apparatus as set forth in claim 1 in which said tip has at least one serrated surface to increase the friction between said tip and said surfaces.

8. Apparatus as set forth in claim 7 in which said serrated surface includes striations to receive molten thermoplastic material.

9. Apparatus as set forth in claim 8 in which said striations are at an angle to, and cross, one another to form a plurality of intermixing channels.

10. Apparatus as set forth in claim 7 in which said striations define a pattern of interlinking channels to promote intermixing of melted thermoplastic material.

11. Apparatus as set forth in claim 1 in which said driving means includes an electric motor associated with each of said rollers.

12. Apparatus as set forth in claim 11 including control means for said motors for synchronizing the speeds of said motors, whereby the possibility of skew of said sheets is reduced.

13. Apparatus for creating a lap-type welded seam between two sheets of thermoplastic material, said welded seam including a uniform intermix zone, said apparatus including sheet material handling means, said handling means including a supporting structure, a pair of nip rollers mounted upon said structure and at least one of said rollers being driven, said rollers defining a nip transverse to the longitudinal dimension of the seam to be formed, an ultrasonic horn having a tip thereon, said horn being capable of reciprocating movement along the axis thereof, said horn being carried by said supporting structure and removably positionable within said nip, with the axis of said horn being transverse to said nip, said tip having serrated surfaces defining a plurality of intermixing channels, and a control circuit adapted to position said tip within said nip, to actuate said ultrasonic horn, and to operate said driven roller, whereby said sheets may be welded together along proximate edges with a strong and uniform seam.

14. Apparatus as set forth in claim 13 in which said ultrasonic horn includes a booster and reciprocates at a frequency between about 20 and 50 kilohertz.

15. Apparatus as set forth in claim 13 in which both of said nip rollers are driven by electric motors and including synchronization control to cause said motors to operate at the same speed.

16. Apparatus as set forth in claim 13 in which said supporting structure is carried by a tricycle carriage.

17. Apparatus as set forth in claim 13 in which said rollers are secured to said supporting structure by supporting arms, the said arm for one of said rollers being secured to one end of that roller, and the arm for the other said roller being secured to the other said roller at the opposite end thereof, whereby one of said sheets may enter said nip with the body of said sheet on one side of said supporting structure and the other of said sheets may enter said nip with its body on the opposite side of said supporting structure.

18. Apparatus for welding two sheets of themoplastic material together along proximate edges of said sheets to form a welded seam, said apparatus including a supporting frame, an upper and a lower joining roller, separate upper and lower arms securing said upper and said lower rollers, respectively, to said frame, with said rollers having parallel axes and forming a nip therebetween, said nip having an axis parallel to said axes, whereby said sheets may be brought together in overlapping relationship in said nip, means for driving at least one of said rollers, a horn having a tip thereon, said tip having a leading edge running transverse to the longitudinal dimension of said horn, and means for mounting said horn on said supporting frame with said tip proximate to said nip with the leading edge of said tip parallel to the axis of said nip, and means for reciprocating said horn and said tip at ultrasonic frequencies, said last-named means including an ultrasonic transducer, whereby said sheets may be overlapped within said nip and said reciprocating tip will rub against the inner surface of said sheets and create frictional heat energy sufficient to melt said material and so weld said sheets together.

19. Apparatus as set forth in claim 18 in which said horn mounting means can move said tip into and away from said nip.

20. In an apparatus for welding together two sheets of thermoplastic material along proximate edges thereof, said apparatus including a pair of nip rollers for receiving and pressing together said edges, said rollers defining a nip therebetween, and means for driving at least one of said rollers, that improvement including an ultrasonically-driven reciprocating welding tool, said welding tool including an ultrasonic transducer and an associated horn adapted to be driven by said transducer axially of said horn, and a tip on said horn, means associated with said nip rollers for positioning said tip in said nip so that said tip will reciprocate towards and away from said nip in a direction transverse to the axes of said nip and of said rollers while said sheets pass through said nip, whereby the inner surfaces of said edges may be melted and said sheets welded together along a seam.

21. In an apparatus as set forth in claim 20, that improvement including serrated surfaces on said tip to increase the friction between said tip and said inner surfaces.

22. In an apparatus as set forth in claim 21, that improvement including recessed striations on said serrated surfaces, said striations being at an angle of about 30 degrees to the axis of said horn.

23. In an apparatus as set forth in claim 21, that improvement in which said serrated surfaces are patterned to cause intermixing of molten thermoplastic material, whereby intermixed zones are formed within said seam.

24. The method of welding together proximate edges of sheets of thermoplastic material including the steps of continuously moving said proximate edges together so said sheets overlap and form a nip, melting the inner surfaces of said sheets as they are moved together, generating frictional heat energy proximate to said nip to cause said melting by rapidly reciprocating a horn tip against said inner surfaces, said reciprocation being in a direction transverse to the axis of said nip, and pressing said surfaces together in a nip as said melting sheets cool.

25. The method of welding set forth in claim 24 including the step of intermixing the melted material from said two inner surfaces.

26. The method of welding as set forth in claim 24 in which the rate of moving said proximate edges together relative to said rate of melting is such as to assure an adequate weld.

27. The method of welding set forth in claim 24 in which said horn is reciprocated at ultrasonic frequencies of between about 20 and 5 kilohertz.

*28. Apparatus for welding sheets of thermoplastic material together along proximate edges of said sheets to form a welded seam, said apparatus including*

*a supporting frame,*

*nip forming means defining a nip and mounted on said frame, said nip having an axis,*

*driving means to drive said sheet through said nip,*

*a horn having a tip and means to reciprocate said horn and said tip in the longitudinal axis of said horn, said horn being carried by said frame with said tip in said nip and positioned such that said reciprocation is in a direction transverse to the axis of said nip,*

*whereby proximate edges of said sheets may move through said nip with one said edge on each side of said tip, be melted on their surfaces by frictional energy created by said reciprocal motion of said tip, and thereafter be pressed together in said nip.*

*29. Apparatus for creating a lap-type welded seam between two sheets of thermoplastic material, said welded seam including a uniform intermix zone, said apparatus including*

*sheet material handling means, said handling means including a supporting structure, a pair of nip rollers mounted upon said structure, said nip being transverse to the longitudinal dimension of the seam to be formed,*

*an ultrasonic horn having a tip thereon, said horn being capable of reciprocating movement along the axis thereof, said horn being carried by said supporting structure and removably positionable within said nip, with the axis of said horn being transverse to said nip, said tip having serrated surfaces defining a plurality of intermixing channels, and*

*a control circuit adapted to position said tip within said nip, to actuate said ultrasonic horn, and to operate said driven roller,*

*whereby said sheets may be welded together along proximate edges with a strong and uniform seam.*

*30. In an apparatus for welding together two sheets of thermoplastic material along proximate edges thereof, said apparatus including nip forming means defining a nip, that improvement including*

*an ultrasonically-driven reciprocating welding tool, said welding tool including an ultrasonic transducer and an associated horn adapted to be driven by said transducer axially of said horn, and a tip on said horn,*

*means associated with said nip for positioning said tip in said nip so that said tip will reciprocate towards and away from said nip in a direction transverse to the axes of said nip while said sheets pass through said nip,*

*whereby the inner surfaces of said edges may be melted and said sheets welded together along a seam.*

*31. The method of welding together sheets of thermoplastic material including the steps of*

*continuously moving said sheets together so said sheets overlap and form a nip,*

*melting the inner surfaces of said sheets as they are moved together,*

*generating frictional heat energy proximate to said nip to cause said melting by rapidly reciprocating a horn tip against said inner surfaces, said reciprocation being in a direction transverse to the axis of said nip, and*

*pressing said surfaces together in said nip as said melting sheets cool.*

* * * * *